(12) United States Patent
Soshiroda et al.

(10) Patent No.: US 6,280,538 B1
(45) Date of Patent: Aug. 28, 2001

(54) HOT ROLLED HIGH STRENGTH STEEL SHEET WITH EXCELLENT FORMABILITY

(75) Inventors: Tetsuo Soshiroda; Yoichi Mukai; Michiharu Nakaya, all of Kakogawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/438,374

(22) Filed: Nov. 12, 1999

Related U.S. Application Data

(63) Continuation of application No. PCT/JP99/01200, filed on Mar. 12, 1999.

(30) Foreign Application Priority Data

Mar. 12, 1998 (JP) .................................................. 10-82619

(51) Int. Cl.[7] ............................ C22C 38/02; C22C 38/04; C22C 38/06
(52) U.S. Cl. ......................... 148/320; 148/330; 148/331; 148/332; 148/333; 148/334; 148/335
(58) Field of Search ............................. 148/320, 330–335

(56) References Cited

U.S. PATENT DOCUMENTS 5,505,796 4/1996 Kawano et al. .

FOREIGN PATENT DOCUMENTS

| 0 586 704 | 3/1994 | (EP) . |
|---|---|---|
| 0881 308 | 12/1998 | (EP) . |
| 57-70257 | 4/1982 | (JP) . |
| 4-32512 | 2/1992 | (JP) . |
| 5-105986 | 4/1993 | (JP) . |
| 5-171345 | 7/1993 | (JP) . |
| 6-306537 | 11/1994 | (JP) . |
| 7-252592 | 10/1995 | (JP) . |
| 2609732 | 2/1997 | (JP) . |
| 9-104947 | 4/1997 | (JP) . |
| 9-137249 | 5/1997 | (JP) . |
| 9-241792 | 9/1997 | (JP) . |

*Primary Examiner*—Deborah Yee
(74) *Attorney, Agent, or Firm*—Oblon, Spivak, McClelland, Maier & Neustadt, P.C.

(57) ABSTRACT

A hot rolled high strength steel sheet having a satisfactory strength-elongation balance and an stretch frangibility and with excellent formability comprising a steel, which contains:

| C | :0.05 ~ 0.15% |
|---|---|
| Si | :0.5 ~ 2.0% |
| Mn | :0.5 ~ 2.0% |
| P | :0.05% or less |
| S | :0.010% or less |
| Al | :0.005 ~ less than 0.10%, | and the balance of Fe and inevitable impurities, and in which the metal structure mainly comprises three phases of ferrite, retained austenite and bainite, the amount of the ferrite [V(F)] is 60~95 area %, the amount of the retained austenite [V($\gamma$)] is 3~15 vol %, the amount of the bainite [V(B)] in the area ratio is 1.5 times or more of the amount of the retained austenite [V($\gamma$)], and the average hardness of the bainite is 240–400 Hv.

18 Claims, 1 Drawing Sheet

HOT ROLLED HIGH STRENGTH STEEL SHEET WITH EXCELLENT FORMABILITY

This application is a continuation of PCT application PCT/JP99/01200, filed Mar. 12, 1999.

FIELD OF THE INVENTION

The present invention concerns a hot rolled high strength steel sheet of excellent formability which can be used suitably, for example, as steel sheet used for the materials of automobiles.

BACKGROUND ART

In recent years, with a view point of improvement for the safety and reduction of fuel cost of automobiles, demands for increasing the strength and reducing the thickness of steel sheets used for automobiles have been increased more and more. Most of thin steel sheets used as the material sheets for automobiles are fabricated by press forming into predetermined shapes. Since the formability usually tends to be worsened as th e strength increases, various studies have been made in order to obtain steel sheets of high strength and also excellent in the formability.

Press forming includes various fabrication modes and required working characteristics vary depending on the members to be pressed in which elongation (E1) and stretch frangibility ($\lambda$) are considered most important as the index for the formability required for hot rolled high strength steel sheets.

As steel sheets of excellent elongation, steel sheets that utilize TRIP (Transformation Induction Plasticity) of retained austenite have been developed as disclosed, for example, in Japanese Published Unexamined Patent Application No. Hei 7-252592, which attains 20,000 N/mm$^2 \cdot$% or more in strength-elongation balance (TS×E1).

On the other hand, as steel sheets having elongation above a certain level, stretch frangibility and low yield ratio characteristics, so-called tri-phase steel sheets comprising three phase structure of ferrite-bainite-martensite have been disclosed, for example, in Japanese Published Unexamined Patent Application No. Sho 57-70257.

However, while the steel sheet of utilizing the TRIP phenomenon of the retained austenite is comparatively satisfactory in the strength-elongation balance but it shows only about 40% of the stretch frangibility ($\lambda$) which does not reach a level capable of satisfying user's demand. In addition, since this steel sheet also has a relatively high yield ratio, it is poor in a shape freezing property and lacks in adaptability to the application use requiring the shape freezability.

The shape freezability means an extent of dimensional change when a work is released from a forming die upon fabrication and a material having a small amount of dimesional change is called as "material of satisfactory shape freezability". That is, when a steel sheet is manufactured by press forming into a product, it is important to ensure the dimensional accuracy required for the final product. In this case, a steel sheet pressed by a pressing machine and is in intimate contact with a forming die shows a shape conforming the forming die but changes the shape upon deforming due to the release of residual stresses. That is, any steel sheet causes considerable change of dimension upon detaching from a pressing die and it is desirable that the dimensional change is small, that is, the shape freezability is satisfactory in order to enhance the dimensional accuracy of a product.

It is said that the yield strength of a material steel sheet gives most significant effect on the shape freezability and it is considered that the yield strength increases as the strength of the material steel sheet increases and, correspondingly, the shape freezability is worsened. Accordingly, it has been demanded for the development of a material having excellent shape freezability while ensuring high strength.

The $\lambda$ described above is a measure for expressing the stretch frangibility, which is a value determined by the following relation:

$$\lambda = (D - D_0) \times 100 / D_0 \ (\%)$$

in which D represents a hole diameter in a case where a conical punch with a 60° apex is forced into an initial hole of a diameter ($D_0$) to enlarge the hole and when a crack penetrates the sheet along the thickness.

Further, the tri-phase steel sheet is excellent in the stretch frangibility and the low yield ratio characteristic compared with a steel sheet based on the retained austenite but it has no sufficient strength-elongation balance.

As a means for obtaining a sheet having a retained austenite and still having an excellent stretch frangibility, a method of incorporating Al by about 0. 10% or more in a steel has been proposed as described, for example, in Japanese Published Unexamined Patent Application No. Hei 5-105986. However, if a great amount of Al is incorporated in the steel, the amount of oxide series inclusions increases, which results in a problem of surface defect or degradation of ductility and also gives undesired effects on the yield and the productivity.

The present invention has been accomplished taking notice on the foregoing problem and it is an object thereof to provide a hot rolled high strength steel sheet having an excellent strength-elongation balance compared with existent steel sheets and also having an excellent stretch frangibility.

DISCLOSURE OF THE INVENTION

The foregoing object can be attained in accordance with the present invention by a hot rolled high strength steel sheet of excellent formability comprising, on the basis of mass %,

| | |
|---|---|
| C | :0.05 ~ 0.15% |
| Si | :0.5 ~ 2.0% |
| Mn | :0.5 ~ 2.0% |
| P | :0.05% or less |
| S | :0.010% or less |
| Al | :0.005 ~ less than 0.10%, | and the balance of Fe and inevitable impurities, in which the micro-structure mainly comprises three phases of ferrite, retained austenite and bainite, the amount of the ferrite [V(F)] is 60~95 area %, the amount of the retained austenite [V($\gamma$)] is 3~15 vol %, the amount of the bainite [V(B)] in the area ratio is 1.5 times or more of the amount of the retained austenite [V($\gamma$)] as the area ratio and the average hardness of the bainite is 240–400 Hv.

In the hot rolled steel sheet according to the present invention, the average grain size of the ferrite is particularly preferably 5.0 $\mu$m or more and it is effective to incorporate an appropriate amount of Cr, or incorporate an appropriate amount of Ca and/or REM or, further, incorporate at least one element selected from the group consisting of Nb, Ti, V, Ni, Mo, B and Cu to further improve the physical properties.

Further, the hot rolled steel sheet according to the present invention has excellent characteristics compared with existent hot rolled steel sheets in that it has a value of tensile strength (TS) x elongation (E1) as high as 22,000 N/mm$^2 \cdot$% or more.

BEST MODE FOR CARRYING OUT THE INVENTION

Figure 1:
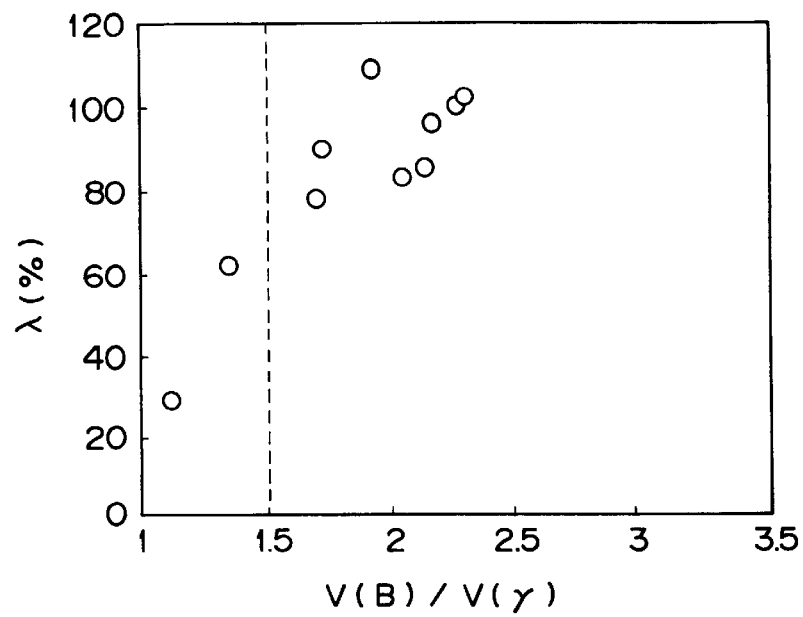
FIG. 1 is a graph showing a relation between {bainite area ratio [V(B)] over retained austenite volume ratio [V(γ)]} and a stretch frangibility (λ) obtained in examples.

For solving the foregoing subjects, the present inventors have studied, from various aspects, microstructures of hot rolled steel sheets containing retained austenite. As a result, it has been confirmed that the strength-elongation balance has a relatively high correlation with the area ratio of the retained austenite as per the knowledge in the prior art and the strength-elongation balance is better as the area ratio of the retained austenite is large. However, it has been found that satisfactory values can not always be obtained for the stretch frangibility even if the area ratio of the retained austenite is large.

Then, as a results of a further study for determining the effects of structural factors other than the retained austenite, it has been confirmed that the stretch frangibility changes remarkably depending on the bainite in the microstructure. The present invention has been accomplished as a result of further studies based on such confirmation and it has been found that an stretch frangibility at a high level can be obtained without deteriorating the strength-elongation balance only when the microstructure contains the retained austenite and steel contains the bainite at a certain level or higher and the bainite is within a range of a predetermined hardness. In addition, it has been recognized that when such conditions are satisfied and, further, the grain size of the ferrite is controlled within an appropriate range, the stretch frangibility is further improved and, in addition, a low yield ratio characteristic can also be provided, based on which the present invention has been accomplished.

At first, the reason for defining compositional ingredients of a hot rolled steel sheet in the present invention will be explained.

C: 0.05~0.15%

C is an essential element for obtaining retained austenite and bainite, if it is less than 0. 05%, the retained austenite volume ratio and the bainite area ratio defined in the present invention can not be ensured. On the other hand, if the amount of the C exceeds 0. 15%, the press formability, particularly, the stretch frangibility is worsened. Accordingly, the amount of C has to be restricted to 0.05% or more and 0.15% or less.

Si: 0.5~2.0%

Si is an essential element for promoting ferrite transformation in the cooling process after hot rolling to obtain the ferrite area ratio of 60% or more. It has also an effect of releasing solid solubilized C in the ferrite and concentrate the same into the austenite and contributing to the improvement of the formability by enhancing the cleanness of the ferrite. Further, it has also an effect of suppressing formation of carbides to retain the austenite. For effectively providing the effects described above, Si has to be contained by 0.5% or more but excessive incorporation rather gives undesired effects on the formability and also deteriorates the weldability and the surface property, so that it has be restricted to 2.0% or less.

Mn: 0.5~2.0%

Mn functions effectively for the improvement of the strength, as well as is effective to suppress the formation of pearlite to facilitate formation of the bainite and the retained austenite and Mn has to be contained at least by 0.5% or more for effectively providing such effects. However, if the amount of Mn is excessive, not only the ductility is deteriorated but also it gives undesired effects on the weldability, so that it has to be restricted to 2.0% or less.

P: 0.05% or less

Since an excessive amount of P worsens formability and toughness, it has to be restricted to 0.05% or less.

S: 0.010% or less

Since S gives an undesired effect on the formability, particularly, the stretch frangibility, it has to be restricted to 0.01% or less.

Al: 0.005~less than 0.10%

Al acts effectively as a deoxidizing ingredient and the effect can be provided effectively by incorporation of 0.005% or more. However, if the amount is excessive, a great amount of non-metal inclusions are formed to cause surface defects or degradation of the formability, so that it has to be restricted to 0.10% or less.

The hot rolled high strength steel sheet according to the present invention comprises the basic composition described above, with the balance being substantially formed of Fe. However, it is also effective to incorporate the following elements as required for further improvement of the characteristics.

Cr: 0.01–1.0%

Cr has an effect of forming the bainite of a predetermined hardness at a predetermined area ratio stably and easily and the effect is provided effectively by incorporation of 0.01% or more of Cr. However, if it is contained in excess of 1.0%, since the martensite tend to be formed easily and the stretch frangibility is deteriorated, it should be restricted to 1.0% or less.

Ca: 0.01% or less and/or REM: 0.05% or less

Ca and REM have an effect of improving the stretch frangibility through the control for the form of sulfides and the effect can be provided effectively by incorporating 0.0005% or more of Ca and 0.005% or more or REM. However, the effect of them is saturated at a certain level of addition amount and addition of them in excess is economically wasteful, so that Ca has to be restricted to 0.01% or less and REM has to be restricted to 0.05% or less.

At least one element selected from the group consisting of:

Nb: 0.005~0.1%,

V: 0.01~0.5%,

Mo: 0.05~1.0%,

Cu: 0.05~1.5%

Ti: 0.005~0.2%,

Ni: 0.01~2.0%,

B: 0.0005~0.01%,

Each of the elements acts effectively for the improvement of the strength of the steel sheet and the effect thereof can not be provided effectively if the content for each of the elements is less than the lower limit value, whereas addition in excess of the upper limit value may possibly cause undesired effects on the formability, particularly, the stretch frangibility.

Then, the microstructure of the steel sheet according to the present invention is explained.

The hot rolled steel sheet according to the present invention has a microstructure mainly comprising three phases of ferrite, retained austenite and bainite.

Ferrite has, by itself, high ductility and also has an effect of promoting the formation of the retained austenite by distributing C to the austenite and it is required by 60% or more in view of the area ratio in order to ensure the strength-elongation balance of 22,000 N/mm$^2$·%. Particularly, for ensuring the strength-elongation balance of 22,000 N/mm$^2$·% or more while ensuring a sufficient elongation, the area ratio of the ferrite is preferably 75% or more and, more preferably, 80% or more. However, if the area ratio of the ferrite exceeds 95%, a hard phase (bainite, retained austenite) becomes insufficient and no satisfactory strength can be ensured. Therefore, the amount of the ferrite in the area ratio is defined as 60%, preferably, 75% and, further preferably, 80% for the lower limit, and as 95% or more preferably, 90% for the upper limit.

Further, when the importance is attached to the shape freezability as a hot rolled steel sheet, it is desirable that the grain size of the ferrite is over 5.0 μm. This is because the yield ratio increases to worsen the shape freezability if the grain size of the fine grain is 5.0 μm or less. Further, in the structure where the retained austenite and the bainite are present together to be described later, the stretch frangibility is further improved by setting the ferrite grain size as over 5.0 μm, more preferably, 6.0 μm or more.

Then, the retained austenite has to be within a range from 3 to 15% by volume ratio (occupying ratio determined by X-ray analysis). If the volume ratio is less than 3%, it is difficult to ensure the strength-elongation balance of 22,000 N/mm$^2$·% or more, whereas if it exceeds 15%, the hardness of a sharing end face upon shearing is remarkably increased to worsen the stretch frangibility. When a particularly preferred stretch frangibility is required, the retained austenite volume ratio is restricted preferably to 10% or less, more preferably, 9% or less.

It is essential that the amount of the bainite satisfies the relation: $[V(B)]>1.5\times[V(\gamma)]$ assuming the area ratio as $[V(B)]$ and $[V(\gamma)]$ as the area ratio of the retained austenite. This is because the stretch frangibility is worsened if the value for $[V(B)]$ is $1.5\times[V(\gamma)]$ or less, and the reason is considered as follows.

In the material where the amount of the bainite satisfies the relation: $[V(B)]>1.5\times[V(\gamma)]$, the retained austenite is present being in contact with the bainite in the microstructure, or tends to be present between lath in the bainite. It is considered that since a most portion of the retained austenite has already been transformed into martensite in a ultimate deformation state and, since cracks at the boundary are less caused when the martensite is in contact with the bainite than the case where it is in contact with the soft ferrite, so that the ultimate deformation performance is improved.

Further, the hardness of the bainite itself gives an effect on the stretch frangibility and it is desirable to define the average hardness of the bainite to 240~400 Hv (Vickers hardness) in order to ensure a stretch frangibility. In the steel sheet mainly comprising the retained austenite, presence of the retained austenite gives a major factor for degrading the stretch frangibility. That is, in a hole enlargement test, a hole enlargement is conducted by aperturing a punched hole. When a hole is apertured by punching, since the edge of the hole is strongly fabricated, the retained austenite transforms into the martensite at the hole edge to greatly increase the hardness. Then, since the hardness of the martensite and that of the ferrite as a matrix differ greatly, distortions are concentrated on the side of the ferrite along the boundary between both of the phases to cause cracks. While the bainite provides a buffer function at the boundary between the martensite and the ferrite, it is desirable that the hardness of the bainite has a value intermediate of the martensite hardness and the ferrite hardness for effectively developing the buffer effect. This effect can not be expected if it is excessively soft. Therefore, the lower limit for the average hardness of the bainite is defined as 240 Hv, more preferably, 250 Hv and, further preferably, 260 Hv. On the other hand, if the hardness of the bainite exceeds 400 Hv, the bainite-ferrite boundary rather forms triggers for cracks to rather worsen the stretch frangibility. Therefore, the upper limit is defined as 400 Hv, more preferably, 380 Hv.

As has been described above, the hot rolled steel sheet according to the present invention comprises a microstructure mainly composed of three phases of ferrite, retained austenite and bainite, and it is preferred that phases other than the three phases described above (pearlite or martensite) is desirably as small as possible. However, presence of them in about 2% or less by the area ratio is permissible in a range not giving undesired effects on the characteristics in the present invention.

EXAMPLE

The present invention is to be explained more concretely with reference to examples. However, the present invention is not restricted by examples to be described below, but may be practiced under any appropriate alteration within such a range as capable of conforming the purpose as described above and to be described later, and any of them is included within the technical scope of the present invention.

Figure 2:
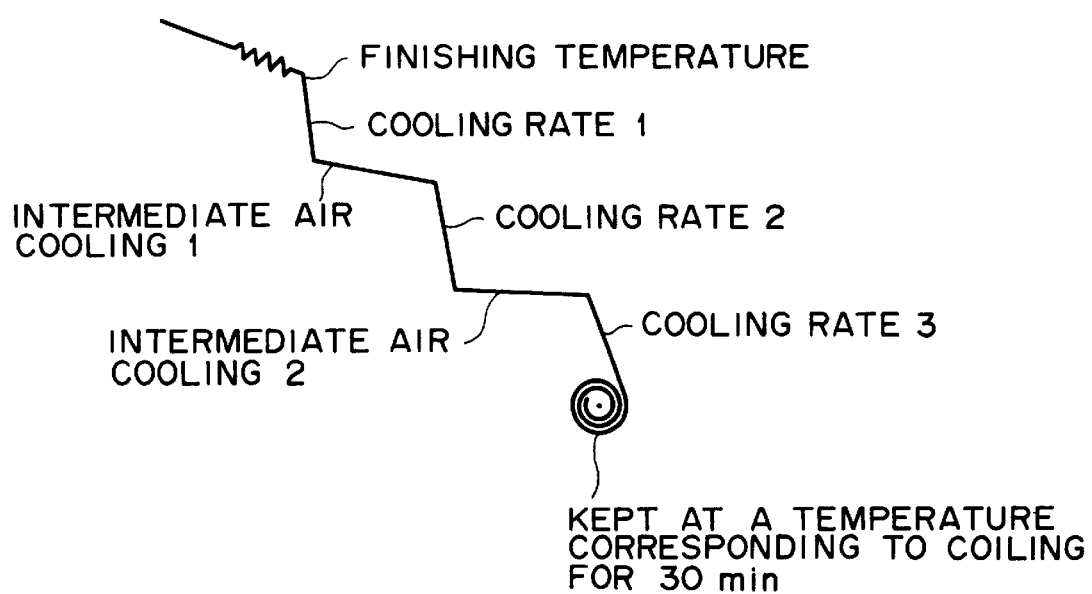
FIG. 2 is a view showing a cooling pattern after finish rolling employed in the examples.

After rough rolling slabs obtained by melting and casting steels of chemical ingredients shown in Table 1 in a vacuum melting furnace into 30 mm thickness, they are heated to 1150 to 1300° C., and rolling is completed at a finish rolling temperature of 780 to 920° C. to obtain steel sheets of 3.0 mm thickness. After cooling the steel sheets under the conditions shown in Table 2 and FIG. 2, they were kept at a temperature corresponding to a coiling temperature (100 to 600° C.) for 30 min and then cooled in the furnace. Subsequently, temper rolling was applied at an elongation ratio of about 0.6%.

TABLE 1

| Steel specimen No. | Chemical ingredient (wt %, balance: substantially Fe) | | | | | | | | Remarks |
|---|---|---|---|---|---|---|---|---|---|
| | C | Si | Mn | P | S | Al | Cr | Others | |
| A | 0.12 | 1.80 | 1.20 | 0.018 | 0.001 | 0.035 | 0.2 | | Steel of the invented |
| B | 0.08 | 1.50 | 1.20 | 0.010 | 0.001 | 0.035 | 0.2 | | Steel of the invented |
| C | 0.11 | 1.50 | 1.10 | 0.015 | 0.002 | 0.035 | — | Ca: 0.0015 | Steel of the invented |
| D | 0.11 | 1.20 | 0.80 | 0.018 | 0.002 | 0.035 | 0.5 | Ca: 0.0015 | Steel of the invented |
| E | 0.14 | 0.40 | 1.40 | 0.015 | 0.003 | 0.035 | — | | Comparative Steel |
| F | 0.20 | 1.80 | 1.50 | 0.018 | 0.001 | 0.035 | — | | Comparative Steel |
| G | 0.12 | 2.5 | 1.80 | 0.013 | 0.001 | 0.035 | 0.8 | | Comparative Steel |
| H | 0.12 | 1.70 | 1.50 | 0.018 | 0.001 | 0.035 | — | (Basic composition) | Steel of the invented |
| I | 0.10 | 1.50 | 1.10 | 0.018 | 0.001 | 0.035 | — | Nb: 0.010 | Steel of the invented |
| J | 0.10 | 1.50 | 1.10 | 0.018 | 0.001 | 0.035 | 0.1 | Cu: 0.20 | Steel of the invented |
| K | 0.10 | 1.50 | 1.10 | 0.018 | 0.001 | 0.035 | 0.1 | Ti: 0.020 Ca: 0.0015 | Steel of the invented |

TABLE 2

| Specimen No. | Steel specimen No. | Hot rolling condition | | | | | | |
|---|---|---|---|---|---|---|---|---|
| | | Finish temperature (° C.) | Cooling rate 1 (° C./sec) | Intermediate air cooling 1 (° C./sec × sec) | Cooling rate 2 (° C./sec) | Intermediate air cooling 2 (° C./sec × sec) | Cooling rate 3 (° C./sec) | Temperature corresponding to coiling |
| 1 | A | 920 | 50 | 710 × 5 | 50 | 510 × 6 | 30 | 400 |
| 2 | B | 920 | 50 | 710 × 6 | 50 | 510 × 6 | 30 | 400 |
| 3 | C | 920 | 80 | 690 × 5 | 50 | 510 × 6 | 30 | 400 |
| 4 | D | 940 | 80 | 690 × 5 | 50 | 510 × 6 | 30 | 420 |
| 5 | A | 920 | 50 | 690 × 5 | 50 | 510 × 6 | 30 | 420 |
| 6 | C | 920 | 50 | 690 × 5 | 50 | 540 × 8 | 30 | 430 |
| 7 | C | 880 | 50 | 670 × 5 | 50 | 460 × 6 | 30 | 380 |
| 8 | D | 920 | 50 | 690 × 5 | 50 | 510 × 6 | 30 | 400 |
| 9 | E | 860 | 40 | 650 × 6 | 70 | none | 70 | 400 |
| 10 | F | 880 | 50 | 650 × 6 | 40 | none | 40 | 500 |
| 11 | A | 880 | 60 | 670 × 7 | 40 | 550 × 9 | 40 | 300 |
| 12 | A | 880 | 60 | 690 × 7 | 60 | none | 40 | 370 |
| 13 | B | 880 | 60 | 670 × 8 | 60 | none | 60 | 100 |
| 14 | A | 880 | 60 | none | 60 | none | 60 | 420 |
| 15 | G | 860 | 60 | 650 × 6 | 60 | none | 60 | 400 |
| 16 | H | 900 | 50 | 650 × 6 | 60 | 510 × 6 | 60 | 400 |
| 17 | I | 900 | 50 | 650 × 6 | 60 | 510 × 6 | 60 | 400 |
| 18 | J | 900 | 50 | 650 × 6 | 60 | 510 × 6 | 60 | 400 |
| 19 | K | 900 | 50 | 650 × 6 | 60 | 510 × 6 | 60 | 400 |
| 20 | C | 870 | 50 | 680 × 10 | 50 | none | 50 | 400 |
| 21 | A | 950 | 50 | 650 × 5 | 50 | 460 × 6 | 30 | 400 |
| 22 | B | 900 | 50 | 650 × 5 | 60 | 510 × 6 | 30 | 400 |

Test specimens for micro-structure observation were sampled from the thus obtained hot rolled steel sheets, microstructures were photographed by an optical microscope and SEM to determine the area ratio for each of the phases by image analysis. For the amount of the retained austenite, a volume ratio was determined by X-ray analysis. Further, a tensile test piece according to JIS No. 5 was cut out of each of the test specimens and mechanical properties were examined by a tensile test.

Further, a hole enlargement test was conducted for examining the stretch frangibility. In the hole enlargement test, a hole of 10 mm diameter ($D_0$) was punched out through a specimen steel sheet at a clearance of 12% to open an initial hole, and then a cone punch at an apex of 60° was inserted into the initial hole to enlarge the hole with the burrs in the initial hole being on the side of the die (counter-punch side) and a hole diameter (D) at the instance cracks penetrate the plate along the thickness was determined, and the hole enlargement ratio ($\lambda$: %) was determined in accordance with the following equation.

$$\lambda = (D - D_0) \times 100 / D_0$$

Test results are shown in Table 3. Further, for specimens Nos. 1~9 and No. 20 in which the microstructure comprises three phases of ferrite (F), retained austenite (γ) and bainite (B), and the ferrite area ratio [V(F)], the retained austenite volume ratio [V(γ)] and the average hardness of bainite Hv(B) satisfy the conditions of the present invention, and a relation between the hole enlargement ratio (λ) and [V(B)]/[V(γ)] assuming the bainite area ratio as [V(B)] is arranged and shown by the graph in FIG. 1.

In Table 3, sum of [V(F)]+[V(B)]+[V(γ)] exceeds 100% in several cases. This is because those containing the retained austenite (γ) formed in the bainite (B) phase were measured not excluding the residual austenite (γ) upon measuring [V(B)].

TABLE 3

| Specimen No. | Steel specimen No. | Structure | Microstructure | | | | | Yield point YP N/mm² | Tensile strength TS N/mm² | Elongation El % | λ % | TS × El N/mm² · % | TS × λ N/mm² · % | Yield ratio YR % | Remarks |
|---|---|---|---|---|---|---|---|---|---|---|---|---|---|---|---|
| | | | V(F) % | V(B) % | V(γ) % | Hv(B) Hv | d(PF) μm | | | | | | | | |
| 1 | A | F + B + γ | 82.2 | 14.0 | 8.2 | 376 | 8.1 | 456 | 712 | 35.6 | 78 | 25502 | 55800 | 64 | Example |
| 2 | B | F + B + γ | 89.3 | 9.5 | 4.2 | 273 | 11.2 | 416 | 630 | 38.4 | 100 | 24200 | 62834 | 66 | Example |
| 3 | C | F + B + γ | 84.5 | 12.1 | 5.6 | 288 | 12.1 | 422 | 620 | 40.0 | 96 | 24820 | 59300 | 68 | Example |
| 4 | D | F + B + γ | 83.3 | 14.4 | 6.3 | 311 | 14.1 | 412 | 599 | 39.8 | 102 | 23840 | 61098 | 69 | Example |
| 5 | A | F + B + γ | 75.4 | 16.5 | 8.1 | 343 | 6.9 | 475 | 720 | 33.0 | 83 | 23760 | 59866 | 66 | Example |
| 6 | C | F + B + γ | 88.2 | 9.8 | 5.1 | 293 | 10.2 | 396 | 591 | 37.6 | 109 | 22210 | 64223 | 67 | Example |
| 7 | C | F + B + γ | 81.9 | 13.6 | 6.4 | 278 | 4.0 | 474 | 608 | 40.4 | 85 | 24541 | 51470 | 78 | Example |
| 8 | D | F + B + γ | 87.4 | 10.5 | 6.1 | 302 | 15.6 | 378 | 592 | 41.3 | 90 | 24450 | 53280 | 64 | Example |
| 9 | E | F + B + γ | 82.7 | 11.3 | 10.1 | 395 | 4.5 | 587 | 815 | 31.5 | 29 | 25671 | 23431 | 72 | Comparative example |
| 10 | F | F + B | 87.5 | 16.5 | 0 | 356 | 16.1 | 432 | 561 | 29.5 | 77 | 16531 | 43265 | 77 | Comparative example |

TABLE 3-continued

| Specimen No. | Steel specimen No. | Structure | Microstructure V(F) % | V(B) % | V(γ) % | Hv(B) Hv | d(PF) μm | Yield point YP N/mm² | Tensile strength TS N/mm² | Elongation E1 % | λ % | TS × E1 N/mm²·% | TS × λ N/mm²·% | Yield ratio YR % | Remarks |
|---|---|---|---|---|---|---|---|---|---|---|---|---|---|---|---|
| 11 | A | F + B + M | 87.5 | 13.5 | 0 | 327 | 4.3 | 477 | 745 | 25.8 | 56 | 19231 | 41359 | 64 | Comparative example |
| 12 | A | F + B + γ | 89.2 | 10.6 | 4.7 | 479 | 3.2 | 521 | 734 | 30.1 | 47 | 22100 | 34542 | 71 | Comparative example |
| 13 | B | F + M | 89.8 | 14.3 | 0 | — | 12 | 450 | 762 | 24.9 | 36 | 18972 | 27619 | 59 | Comparative example |
| 14 | A | F + B + γ | 41.9 | 59.3 | 8.9 | 261 | 3.2 | 665 | 821 | 17.2 | 52 | 14100 | 42702 | 81 | Comparative example |
| 15 | G | F + B + γ | 69.5 | 16.5 | 16.0 | 423 | 5.6 | 648 | 853 | 30.1 | 25 | 25683 | 21085 | 76 | Comparative Example |
| 16 | H | F + B + γ | 82.8 | 12.1 | 7.1 | 270 | 6.7 | 438 | 654 | 38.0 | 80 | 24852 | 52320 | 67 | Example |
| 17 | I | F + B + γ | 89.5 | 8.2 | 4.3 | 301 | 3.0 | 539 | 681 | 34.5 | 74 | 23495 | 50394 | 78 | Example |
| 18 | J | F + B + γ | 86.4 | 10.1 | 5.5 | 250 | 8.1 | 436 | 623 | 38.2 | 88 | 23799 | 54824 | 70 | Example |
| 19 | K | F + B + γ | 84.7 | 11.2 | 6.1 | 290 | 4.8 | 500 | 641 | 37.0 | 79 | 23717 | 50639 | 78 | Example |
| 20 | C | F + B + γ | 75.2 | 15.0 | 11.2 | 321 | 7.0 | 505 | 702 | 36.2 | 62 | 25412 | 43524 | 72 | Comparative example |
| 21 | A | F + B + γ | 73.2 | 18.1 | 11.2 | 345 | 6.0 | 540 | 750 | 30.3 | 65 | 22725 | 48750 | 69 | Example |
| 22 | B | F + B + γ | 87.0 | 9.8 | 4.0 | 210 | 7.2 | 405 | 624 | 35.0 | 50 | 21840 | 31200 | 65 | Comparative example |

(note):
F: Ferrite,
B: Bainite
γ: Retained austenite
M: Martensite,
V(F): Ferrite area ratio
V(γ): Retained austenite volume ratio
V(B): Bainite area ratio
d(PF): Ferrite grain size It can be seen from FIG. 1 that no satisfactory stretch frangibility can be obtained when the microstructure merely comprises three phases of ferrite, retained austenite in which bainite and [V(F)], [V(γ)] and Hv(B) satisfy the conditions defined above according to the present invention but those having the bainite area ratio [V(B)] exceeding 1.5×[V(γ)] have satisfactory stretch frangibility.

Further, it can be seen from Table 3 that examples satisfying the defined conditions of the present invention have not only satisfactory flange property but also the attain the strength as high as 590 N/mm² or more, as well as TS×E1 of 22,000 N/mm³·% or more and TS×λ of 48,000 N/mm³·% or more, and have excellent formability. Further, those having a ferrite grain size of 5.0 μm or more have the yield ratio (YR) of 70% or less and also excellent shape freezability.

EFFECT OF THE INVENTION

Since the present invention has been constituted as described above in which the compositional ingredients of the hot rolling steel sheet are specified, the microstructure mainly comprises three phases of ferrite, retained austenite and bainite, the occupying ratio in each of the phases is specified and the average hardness of the bainite is specified, whereby it is possible to provide a hot rolled steel sheet of excellent formability having excellent stretch frangibility at TS×E1 of 22,000 N/mm³·% or more and of excellent formability.

What is claimed is:
1. A hot rolled high strength steel sheet comprising a steel comprising:

| | |
|---|---|
| C | :0.05 ~ 0.15% |
| Si | :0.5 ~ 2.0% |
| Mn | :0.5 ~ 2.0% |
| P | :0.05% or less |
| S | :0.010% or less |
| Al | :0.005 ~ less than 0.10%, | and the balance of Fe and inevitable impurities, wherein
the structure of said steel mainly comprises a ferrite phase, a retained austenite phase and a bainite phase, and the amount of said ferrite phase, V(F), is 60~95 area %, the amount of the retained austenite phase, V(γ), is 3~15 vol %, the amount of the bainite phase, V(B), in the area ratio is 1.5 times or more of the amount of the retained austenite phase, the average hardness of the bainite phase is 240–400 Hv, and the average grain size of the ferrite phase is 5.0 μm or more.

2. The hot rolled high strength steel sheet of claim 1, wherein the steel further comprises from 0.01 to 1.0% of Cr.

3. The hot rolled high strength steel sheet of claim 1, wherein the steel further comprises 0.01% or less of Ca and/or 0.05% of REM.

4. The hot rolled high strength steel sheet of claim 2, wherein the steel further comprises 0.01% or less of Ca and/or 0.05% of REM.

5. The hot rolled high strength steel sheet of claim 1, wherein the steel further comprises at least one element selected from the group consisting of
Nb: 0.005~0.1%,
Ti: 0.005~0.2%,
V: 0.01~0.5%,
Ni: 0.01~2.0%,
Mo: 0.05~1.0%,
B: 0.0005~0.01%, and
Cu: 0.05~1.5%.

6. The hot rolled high strength steel sheet of claim 2, wherein the steel further comprises at least one element selected from the group consisting of
Nb: 0.005~0.1%,
Ti: 0.005~0.2%,
V: 0.01~0.5%,
Ni: 0.01~2.0%,
Mo: 0.05~1.0%,
B: 0.0005~0.01%, and
Cu: 0.05~1.5%.

7. The hot rolled high strength steel sheet of claim 3, wherein the steel further comprises at least one element selected from the group consisting of
Nb: 0.005~0.1%,
Ti: 0.005~0.2%,
V: 0.01~0.5%,
Ni: 0.01~2.0%,
Mo: 0.05~1.0%,
B: 0.0005~0.01%, and
Cu: 0.05~1.5%.

8. The hot rolled high strength steel sheet of claim 4, wherein the steel further comprises at least one element selected from the group consisting of
Nb: 0.005~0.1%,
Ti: 0.005~0.2%,
V: 0.01~0.5%,
Ni: 0.01~2.0%,
Mo: 0.05~1.0%,
B: 0.0005~0.01%, and
Cu: 0.05~1.5%.

9. The hot rolled high strength steel sheet of claim 1, having a tensile strength (TS)×elongation ratio (E1) of 22,000 N/mm$^3$·% or more.

10. The hot rolled high strength steel sheet of claim 2, having a tensile strength (TS)×elongation ratio (E1) of 22,000 N/mm$^3$·% or more.

11. The hot rolled high strength steel sheet of claim 3, having a tensile strength (TS)×elongation ratio (E1) of 22,000 N/mm$^3$·% or more.

12. The hot rolled high strength steel sheet of claim 4, having a tensile strength (TS)×elongation ratio (E1) of 22,000 N/mm$^3$·% or more.

13. The hot rolled high strength steel sheet of claim 5, having a tensile strength (TS)×elongation ratio (E1) of 22,000 N/mm$^3$·% or more.

14. The hot rolled high strength steel sheet of claim 1, wherein V(F) is 75~90 area %.

15. The hot rolled high strength steel sheet of claim 1, wherein V(F) is 80~90 area %.

16. The hot rolled high strength steel sheet of claim 1, wherein the average grain size of the ferrite phase is 6.0 $\mu$m or more.

17. The hot rolled high strength steel sheet of claim 1, wherein V($\gamma$) is 3~9 vol %.

18. The hot rolled high strength steel sheet of claim 1, wherein the average hardness of the bainite phase is 260–380 Hv.

* * * * *